United States Patent [19]

Nishioka

[11] 4,148,103

[45] Apr. 10, 1979

[54] TOILET OF INCINERATING TYPE

[75] Inventor: Hiroshi Nishioka, Toyonaka, Japan

[73] Assignee: Volcano Kabushiki Kaisha, Osaka, Japan

[21] Appl. No.: 844,483

[22] Filed: Oct. 21, 1977

[30] Foreign Application Priority Data

Feb. 7, 1977 [JP] Japan .................................. 52/12807

[51] Int. Cl.$^2$ ............................................ A47K 11/02
[52] U.S. Cl. ..................................... 4/111.1; 4/111.2; 4/111.4
[58] Field of Search ............. 4/131, 118, 111.1, 111.2, 4/111.3, 111.4, 111.5, 111.6

[56] References Cited

U.S. PATENT DOCUMENTS

| 3,319,588 | 5/1967 | Duncan | 4/131 X |
| 3,436,765 | 4/1969 | Sundberg | 4/131 |
| 3,624,843 | 12/1971 | Andrus | 4/131 |
| 3,683,425 | 8/1972 | Patterson | 4/131 |
| 3,837,012 | 9/1974 | Rassbach et al. | 4/131 |

*Primary Examiner*—Henry K. Artis
*Attorney, Agent, or Firm*—Wenderoth, Lind & Ponack

[57] ABSTRACT

A toilet of the incinerating type includes several pots which are set on a turntable at equal angular intervals, with one of the pots ready for use at all times. A pot containing human waste is automatically connected to an incinerator for incineration of the waste, and the other empty pots are automatically moved to a desired position ready for use and a position waiting for use.

13 Claims, 5 Drawing Figures

TOILET OF INCINERATING TYPE

BACKGROUND OF THE INVENTION

This invention relates to a toilet of the incinerating type, in which human wastes are disposed of by incineration.

Generally, human waste evacuated at the flush-type toilet of dwelling houses, factories, etc., is first treated by a purification apparatus, such as a septic tank, and then discharged into a river, lake, sea, etc. However, where such purifying apparatus for human wastes is difficult to install, for example, in the case of carriages, ships, construction fields, etc., human wastes evacuated are temporarily stored in a raw sewage storage tank and then transported to sewage disposing facilities or carried directly to the ocean where they are deposited. However, the latter procedure will pose the problem of sea pollution. In the case where a purifying apparatus is installed in a golf course or a construction field for its own use, the cost of installation is very high and also a large site is required for installation.

Under the above circumstances, various methods of incinerating human wastes have been proposed recently and some of them have been put into practice. However, the conventional incinerating type toilet is so designed that after evacuation or use, a lid of the stool is let down and combustion gas is supplied from the side of the stool. Therefore, fairly long time is required for burning of the human wastes and for then allowing the heated incinerating apparatus to cool down. Thus, the toilet cannot be used while incineration is carried out and before the incinerating apparatus cools down. Moreover, there is a danger that the room or surrounding environment in which the toilet is located will be filled with bad odors while burning and cooling are carried out. Furthermore, since the fire catching portion of the incinerator is exposed, there is every possibility that it will be splashed with urine during evacuation or use of the toilet, with the result that ignition is made possible.

In view of the above disadvantages of conventional devices the present invention provides a toilet of the incinerating type which can be used at any time.

BRIEF DESCRIPTION OF THE DRAWINGS

Advantages of the present invention will be described below, with reference to a preferred embodiment thereof as shown in the accompanying drawings, in which.

DETAILED DESCRIPTION OF THE INVENTION

Figure 1:
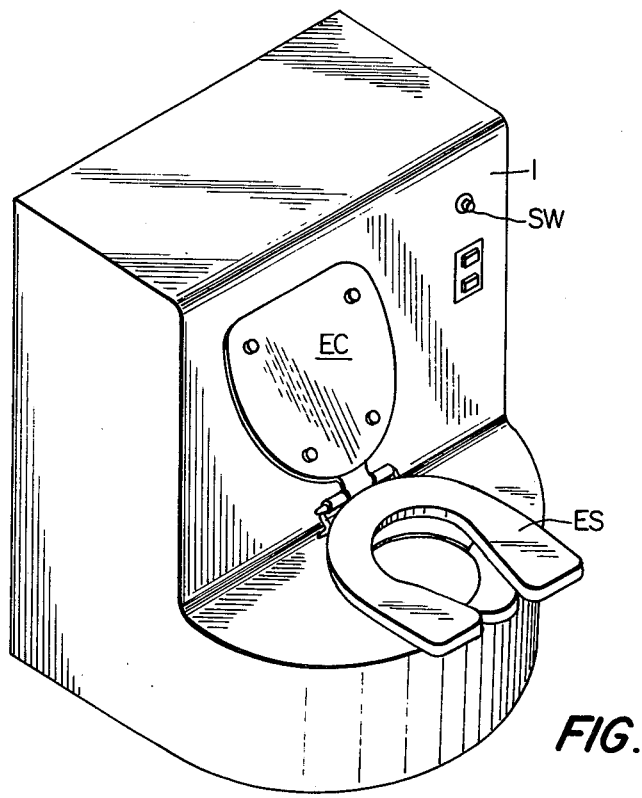
FIG. 1 is an exterior view of the device according to the present invention.

In the drawings, numeral 1 denotes the casing of a toilet of the incinerating type, casing 1 having an L-shaped or other desired configuration. To the desired position of use of the casing 1, a stool base ES and a lid EC are pivotally secured. In order to prevent the heat generated by an incinerating device from being transmitted to the casing 1, the incinerating device and an exhaust device are provided in a cooling chamber 2. This cooling chamber 2 has outer walls of adiabatic material 2R so that it can easily withstand the heat generated by the incinerating device, cooling chamber 2 is open at its bottom B, from which air for cooling is led into the coolng chamber 2. An incinerator 3 is installed in the cooling chamber 2, with a gap A between the outer circumferential surface of the incinerator 3 and the inner circumferential surface of the cooling chamber 2, so that cooling is effected by air passing through the gap A. A passage C through which the air for cooling passes is made by providing a desired gap between the outer circumferential surface of an exhaust pipe 4 and the internal surface of the cooling chamber 2. An extreme outer end 4a of exhaust pipe 4 is throttled to be made into a nozzle-like configuration so that a Venturi tube-type configuration is formed by the opening of the passage C and the extreme end of exhaust pipe 4. Thus, A will be created in passage C negative pressure by utilizing exhausting pressure from the exhaust pipe 4, and the cooling air introduced from the opening B of the cooling chamber 2 will be drawn through the gap A and the passage C. The extreme outer end of passage C is connected to a first mixing chamber 5 of the required capacity, in which the exhaust gas jetted from the exhaust pipe 4 and the cooling air from passage C are mixed to lower the exhaust gas temperature. The first mixing chamber 5 is provided in a second mixing chamber 6 is such a fashion that a passage D for cooling air is formed between the outer circumferential surface of the first mixing chamber 5 and the inner circumferential surface of the second mixing chamber 6. The extreme end 5a of the first mixing chamber 5 is throttled so that it is formed to have a nozzle-like configuration, whereby the preliminarily cooled exhaust gas is jetted out from end 5a at a high speed and is mixed with secondary cooling air introduced from a cooling fan 7, such that the exhaust gas temperature is further lowered to such an extent that it no longer is dangerous. Thus, the exhaust gas is discharged into the atmosphere through an exhaust pipe 8 connected to the second mixing chamber 6. A pot 11 in which human waste is received is removably joined with an opening at the underside of the incinerator 3 in the cooling chamber 2. Joining of pot 11 is carried out by a vertically movable device provided in the cooling chamber 2. The mechanism of this vertically movable device is explained below.

Figure 4:
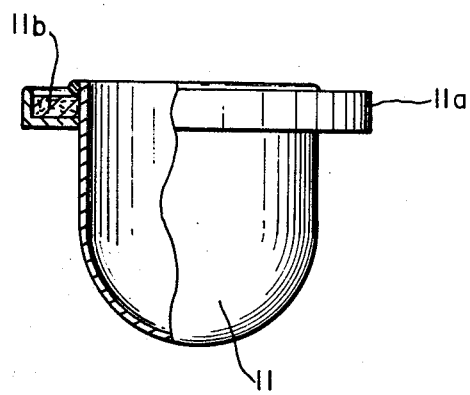
FIG. 4 is a cross section of a pot of the device.

A vertically movable rod 10 is movably fitted in each of opposite guides 9 provided alongside the inner wall of the cooling chamber 2 or embedded in the wall of the cooling chamber 2. The rods 10 have at each of their respective lower ends a hanging member 10a to support a flange 11a of the pot 11. At the upper part of each rod 10 is a rack L, with which is engaged with a respective pinion P to be driven by a motor $M_1$. Pinions P of the rods 10 are turned simultaneously so that racks L engaging with the pinions are caused to rise and fall, and thus the pot 11 supported by the hanging members 10a is raised or lowered while it is maintained horizontal. Joining together of the pot 11 and the incinerator 3 is effected when the pot 11 is raised. In order to ensure tight joining of pot 11 and incinerator 3, flange 11a is provided at the outer circumference of the pot 11. Provided at the upper side of flange 11a is a packing 11b (FIG. 4) of a material having a high heat resistance. Through the medium of this packing 11b, a tight connection of the pot 11 to the incinerator 3 is effected, so that bad odors, exhaust gas, etc., will not leak out of the incinerator 3 and pot 11. In order to have the rods 10 rise and fall smoothly, each guide 9 has formed therein a slit extending over the entire range of the rising and falling movement of the hanging member 10a. The hanging members 10a protrude from the slits into the cooling chamber 2, and the air for cooling the outer circumference of the incinerator 3 is partly led to the rods 10 and the guides 9 so that the rods 10 will not be affected by the heat from incineration. A tip of a gas blowing pipe 13 of a burner unit 12 for incineration and a fan extends into the incinerator 3, so that combustion gas or cooling air maybe jetted into the incinerator 3 to effect incineration of human waste in pot 11 and cooling of the pot 11 after incineration. A mashing rod or an agitating vane 15 extends through incinerator 3 to the inner bottom of the pot 11. The agitating vane 15 is driven by a motor $M_3$ disposed above the incinerator 3, whereby the human waste in pot 11 is kneaded and agitated so as to shorten the time required for incineration.

Figure 2:
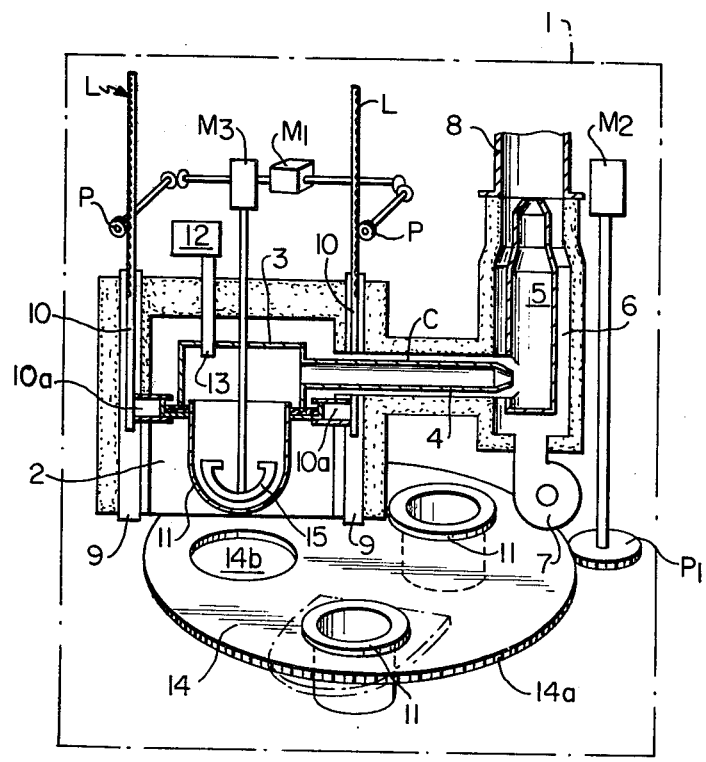
FIG. 2 is a cross section of the device shown in FIG. 1.
Figure 3:
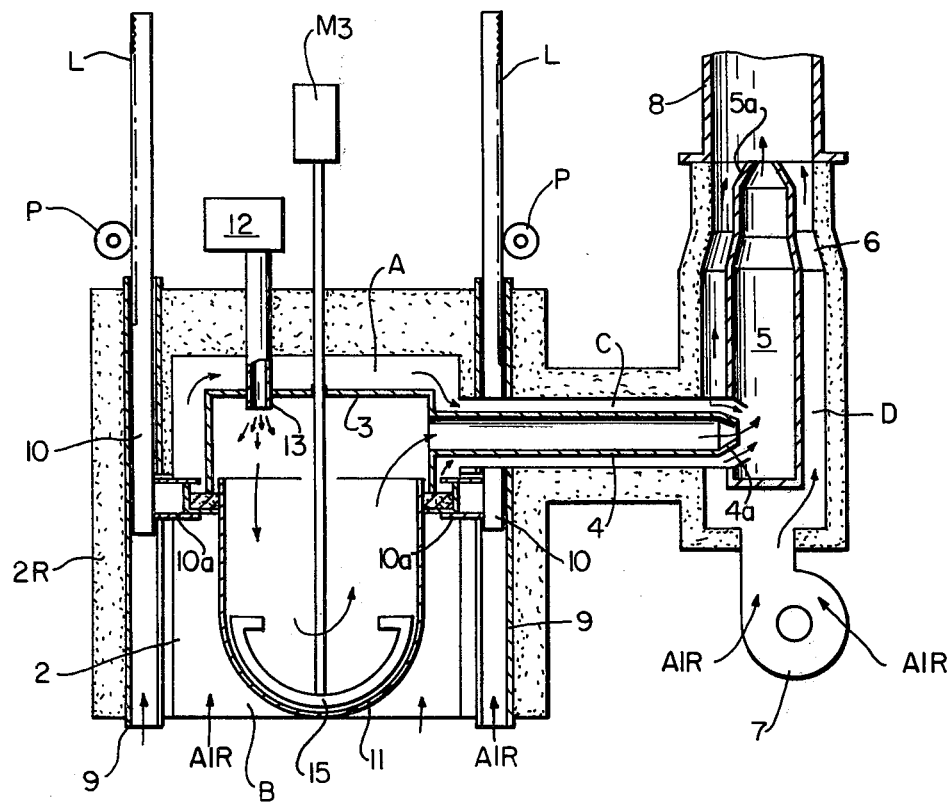
FIG. 3 is a cross section of a main part of the device according to the present invention.

A plurality of pots to receive human waste therein are provided, so that while one pot containing human waste is being subjected to an incinerating process, the other pots are ready for use. For this purpose, a turntable system is adopted for the pots. For example, a revolvable disk-type table 14 on which a plurality of pots are placed is provided in the casing 1 and below the incinerating device and the stool base ES. A gear 14a is cut in the periphery of the table 14 or a chain is wound round the periphery to form a chain gear. Pinion $P_1$ to be driven by a motor $M_2$ engages with gear 14a. In this case, pots 11 are fixed on the table 14 at equal intervals, and each such interval is regarded as one pitch. The table 14 is turned intermittently in such a fashion that each turning thereof will correspond to the above-mentioned pitch. In this embodiment, three pots are fixed on the table 14 at equal angular intervals of 120°. However, the number of pots on the table 14 should be determined according to the frequency of the use of the toilet to be installed. The above-mentioned table 14 is a disk having the desired diameter, and holes 14b are formed in the disk at equal angular intervals to receive each pot 11 therein, as shown in FIG. 2. As shown in FIG. 3, the pot 11 has a cup-shaped configuration with a flange and a necessary capacity, and is made of heat-resistant material. The incineration device is installed at a location above the table 14 in the casing 1 and at a position which is angularly spaced 120° from the stool base ES (in the case where three pots are fixed to the table at equal intervals).

Figure 5:
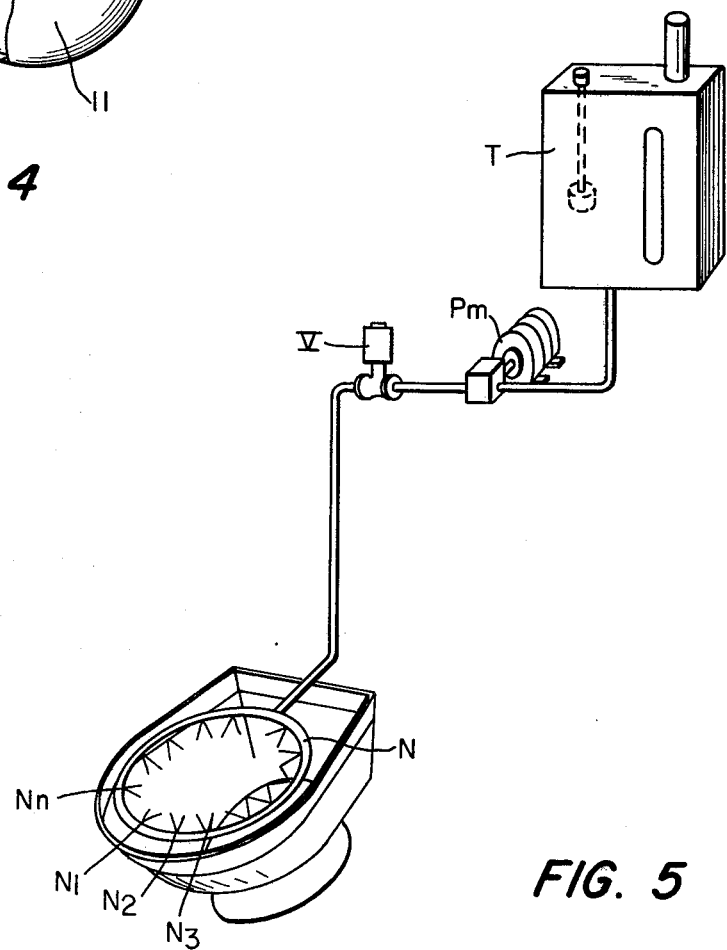
FIG. 5 is a diagram illustrating an apparatus for jetting a deodorizing liquid according to the invention.

FIG. 5 shows a purifying device intended for reducing the cleaning frequency of the stool and for sanitary safety. An annular sprayer N having plural nozzles $N_1$, $N_2$, $N_3 \ldots N_n$ is provided at the inner circumference of the stool base ES and is connected to a tank T containing deodorant cleansing liquid by a pipe for supplying cleansing liquid via a pump Pm and an electromagnetic valve V. After or before evacuation, the pump Pm is actuated to jet out cleansing liquid from the nozzles of the sprayer for cleaning the stool.

When the pot 11 containing human waste reaches, e.g., by rotation, the position just below the incinerating device, the flange 11a of the pot 11 is received and held by hanging members 10a provided at the lower ends of the rods 10. When the pinions P are driven while the pot 11 is held by members 10a, the rods 10 rise and the pot 11 is tightly connected to the underside of the incinerating device through the medium of the packing 11b. Upon detection of the connection of the pot 11 with the incinerator 3, e.g., by a limit switch or the like, the stirring vane 15 is actuated and at the same time the burner unit 12 is ignited, whereby combustion gas is jetted into the incinerator 3 and the pot 11 through gas blowing pipe 13. This state is maintained during a predetermined time established to ensure incineration of the human waste. At this time, gas blown out of the gas blowing pipe 13 is exhausted from the incinerator 3 and the pot into the first mixing chamber 5 via the exhaust pipe 4. When this exhaust gas is discharged, the extreme end of the passage C will be at a negative pressure due to the venturi effect, whereby heat discharged from the incinerator 3 and from the outer surface of the pot 11 is cooled down by the cooling air drawn in from B, which cooling air is then supplied to the first mixing chamber 5. The air and exhaust gas thus supplied into the first mixing chamber 5 are mixed therein, whereby the exhaust gas temperature is lowered and the exhaust gas is led into the second mixing chamber 6 where it is mixed with cooling air supplied from the cooling fan 7. Thus, the exhaust gas temperature is further lowered, and the exhaust gas is finally discharged into the atmosphere. In this way, heat generated in conjunction with the incineration of human waste is prevented from being transmitted to the casing 1, and at the same time, the pot after incineration of the human waste, is cooled down to a certain temperature. More particularly, after incineration, the burner is put out, the stirring vane 15 is stopped, and a fan (not shown in the drawing) of the burner unit 12 alone is driven, whereby the pot 11 connected to the incinerator 3 is supplied only with cooling air. Thus, the pot is cooled from both the inside and the outside for several minutes and the whole process is finished. When the toilet is used in succession, if the pot temperature is lowered to a certain degree (within 1 minute) after incineration the rods 10 are lowered and the pot 11 disengages from the incinerator 3 and is again held by the table 14, whereupon the table 14 begins to turn and moves the pot 11 to the next position. The pot 11 which has been transferred to the next position is not yet completely cooled and must be cooled further. Thus, secondary cooling is carried out at the next position or at the waiting position which is between the position at which incineration of human waste occurred and the position of utilization. This waiting position is just below the fan 7, whereby the pot at the waiting position is secondarily cooled by the air current to be drawn in by the fan 7.

The time during which the burner unit 12 operates is so determined that the maximum amount of human excrement at one time is entirely incinerated. The fan of the burner unit 12 works for a certain time after completion of incineration of the human waste so that the pot 11 is cooled compulsorily. The driving time of this fan can be predetermined, and the driving of the cooling fan, the raising and lowering of the pot and the turning of the table are all synchronized with the burner unit 12, so that pushing of the first starting button SW (FIG. 1) after evacuation or use of the device initiates the automatic operation of all parts.

According to the present invention, since the incinerating device is located at a position different from the evacuating or use position, and after evacuation the pot containing human waste is moved to the incinerating position where it is connected to the incinerating device having a burner unit, the incinerating device is entirely free from the effect of evacuation and therefore is free from the trouble of bad ignition. Moreover, since the incineration is carried out with the pot and the incinerating device tightly connected together and negative pressure is present in the casing, incineration is carried out without the danger of leakage of bad odors. Also, as the stirring vane kneads and stirs the human waste in the pot during the burning operation, effective incineration can be carried out in only several minutes by high heat/high speed incineration. The present invention is most suitable as a simple lavatory in a ship, at a golf course, at the construction field or at an isolated ward of a hospital.

What is claimed is:

1. A toilet of the incineration type, said toilet comprising:
   a turntable mounted for rotation about an axis;
   a plurality of waste receiving pots removably mounted on said turntable at equal angular intervals about said axis;
   means for rotating said turntable about said axis to selectively align each of said pots at predetermined positions including a waste receiving position and an incineration position;
   an incinerator located to confront one of said pots aligned at said incineration position;
   means for removing said one pot from said turntable and tightly joining said one pot to said incinerator, such that the interiors of said one pot and said incinerator form an enclosed chamber;
   means for jetting combustion gas into said chamber to thereby incinerate waste contained in said one pot;
   stirring means extending into said chamber for stirring and kneading said waste during incineration;
   means for discharging exhaust gas from said chamber during said incineration; and
   means for circulating cooling air around the exterior surfaces of said incinerator and said one pot during said incineration to thereby cool said exterior surfaces, and for then mixing said cooling air with said exhaust gas to thereby reduce the temperature of said exhaust gas.

2. A toilet as claimed in claim 1, wherein said turntable is mounted for rotation about a vertical axis.

3. A toilet as claimed in claim 2, wherein said incinerator is positioned above said turntable and has an open bottom portion, and each said pot has an open top portion and an exterior annular flange.

4. A toilet as claimed in claim 3, wherein said removing means comprises means for contacting the bottom of said flange of said one pot and for thereby raising said pot from said turntable until said flange is in tight contact with the lower end of said incinerator.

5. A toilet as claimed in claim 4, wherein said contacting and raising means comprises plural vertically movable rods, each said rod having at a lower position thereof a hanging member adapted to contact the bottom of said flange, and means for moving said rods, said hanging members and said one pot upwardly.

6. A toilet as claimed in claim 5, wherein said moving means comprises a rack on each said rod, a pinion mounted in engagement with each said rack, and a motor for driving said pinions.

7. A toilet as claimed in claim 1, wherein said jetting means extends through said incinerator into said chamber, said jetting means further comprising means for jetting cooling air into said chamber after the completion of said incineration.

8. A toilet as claimed in claim 2, wherein said discharging means comprises an exhaust pipe extending from said incinerator.

9. A toilet as claimed in claim 8, wherein said circulating means comprises a cooling chamber surrounding said incinerator and said one pot, and a cooling passage extending from said cooling chamber and surrounding said exhaust pipe, the outer ends of said exhaust pipe and said cooling passage being of a construction to create a negative pressure in said cooling passage upon the discharge of exhaust gas from said outer end of said exhaust pipe, whereby said cooling air is drawn through said cooling chamber and said cooling passage.

10. A toilet as claimed in claim 9, wherein said mixing means comprises a primary mixing chamber positioned to receive said exhaust gas from said exhaust pipe and said cooling air from said cooling passage.

11. A toilet as claimed in claim 10, further comprising a secondary mixing chamber positioned to receive the mixture of exhaust gas and cooling air from said primary mixing chamber, and means for mixing additional cooling air with said mixture in said secondary mixing chamber, to thereby further cool said exhaust gas.

12. A toilet as claimed in claim 11, wherein said additional cooling air mixing means comprises a cooling fan.

13. A toilet as claimed in claim 1, wherein said stirring means comprises an agitator extending through said incinerator.

* * * * *